US006999606B1

(12) United States Patent
Frischholz

(10) Patent No.: US 6,999,606 B1
(45) Date of Patent: Feb. 14, 2006

(54) METHODS AND SYSTEM FOR RECOGNIZING PEOPLE WITH MODEL-BASED FACE DETECTION

(75) Inventor: Robert Frischholz, Nürnberg (DE)

(73) Assignee: HumanScan GmbH, Erlangen (DE)

( * ) Notice: Subject to any disclaimer, the term of this patent is extended or adjusted under 35 U.S.C. 154(b) by 0 days.

(21) Appl. No.: 09/806,785

(22) PCT Filed: Oct. 4, 1999

(86) PCT No.: PCT/EP99/07334

§ 371 (c)(1),
(2), (4) Date: May 9, 2001

(87) PCT Pub. No.: WO00/21021

PCT Pub. Date: Apr. 13, 2000

(30) Foreign Application Priority Data

Oct. 5, 1998 (DE) ................................. 198 47 261

(51) Int. Cl.
*G06K 9/00* (2006.01)
(52) U.S. Cl. .................................................... 382/118
(58) Field of Classification Search ........ 382/115–118, 382/140; 235/380, 382, 382.5; 358/296; 340/5.53, 5.83; 902/2–6
See application file for complete search history.

(56) References Cited

U.S. PATENT DOCUMENTS 5,793,495 A * 8/1998 Klotz, Jr. ..................... 358/296
6,141,438 A * 10/2000 Blanchester ................ 382/140

OTHER PUBLICATIONS

Altaf eta al., Face recognition using the HAVNET neural networks, SPIE vol. 2492, pp. 873-883.*
Frischholz et al., Avoiding replay attacks in a face recognition system using head pose estimation, IEEE Computer society 2003, pp. 1-2.*
Frischholz et al., BioID: A multimodal biometric identification system, IEEE Feb. 2000, pp. 64-68.*

* cited by examiner

*Primary Examiner*—Vikkram Bali
(74) *Attorney, Agent, or Firm*—Duane Morris LLP

(57) ABSTRACT

The invention relates to a face finding method and system in a binarized image by comparing the dot group of the binarized image with the dot group of a face model, wherein the dot groups of the binarized image and of the face model are compared on the basis of the Hausdorff spacing between the dots of the dot groups and a face is recognized in the binarized image when a measure derived from the Hausdorff spacing fails to reach a limit value.

21 Claims, 2 Drawing Sheets

METHODS AND SYSTEM FOR RECOGNIZING PEOPLE WITH MODEL-BASED FACE DETECTION

The invention relates to a personal recognition method and system, including model-based face finding.

There are methods and systems of biometric personal recognition based on a combination of face recognition, speech recognition, and lip movement recognition. The critical part thereof is the face finding. The invention relates to a method and a system of localizing the face of a person in any camera pictures within such a system of biometric personal recognition.

The fundamental element in face recognition is the face finding, i.e. the precise localizing of the image sector which corresponds to the human face. Some solutions proposed in the prior art simplify these problems by requiring a uniform background in front of which the human face can be found. A face also can be recognized by including moving picture information, it being assumed that the face is contained only in that area of a picture which changes in the course of a picture sequence.

Such simple approaches no longer meet present day requirements of face finding and face recognition. Personal recognition nowadays is assisted, for instance, by PC desk top cameras and other mobile cameras and, therefore, face finding must be robust and work with any kind of background, even with a moving background picture.

The most successful approaches known to date in this field make use of neuron networks. These networks are trained with a great number of examples of faces. In this training an even greater number of "non-face images" are used as a counter-class so that, in the end, the neuron network will be able to distinguish between face and background. It is a disadvantage of this method, apart from the long computing time, that it is highly dependent on variants, like scaling, rotation, and distortion.

It is, therefore, an object of the invention to indicate a novel system and method of face finding which is both robust and able to accomplish the face finding in real time.

This object is met, according to the invention, by a method comprising the features recited in claim 1 and a system comprising the features recited in claim 8.

The method and system according to the invention are model-based. What this means is that a binary image of a human face or a so-called "line drawing" is searched for in a corresponding overall image. Thus an original picture first is converted into a binary image, for instance, by means of edge extraction. This binarized image then is compared with a binary face model to seek and find the image of the human face in the corresponding binarized total image. In contrast to the known approaches, therefore, it is not the intensity value of the individual camera pixels which is compared or pixel variations which are looked for. Rather, the invention relies on a model structure of the type of a line drawing which may be available, for example, in the form of a bit image.

The model of the face or the "line drawing" is compared with the binarized image by means of a modified version of the so-called Hausdorff spacing in numerous scaling, rotation, and distortion variants of the image. The application of the Hausdorff spacing to face recognition was described, e.g. by B. Takacs and H. Wechsler in "Face Recognition Using Binary Image Metrics", 2nd International Conference on Automatic Face and Gesture Recognition, IEFF Proceedings, April 1998. Reference is expressly made to that publication and the explanation it contains of the Hausdorff spacing.

The publication mentioned describes the use of the Hausdorff spacing for purposes of face recognition. It is stated expressly that face finding is achieved by a method which is totally different. It was not taken into consideration in the prior art to apply the Hausdorff spacing for the purpose of face finding, among other things because this algorithm takes an awful lot of calculating time.

The fundamental differences between the problems of face finding and face recognition should be recalled: Once the face is found in a picture, especially in a moving picture this facial picture can be compared with a collection of faces from a data base by almost any method of recognition or identification. If the face in question is contained in the data base the hit rates in general usually are very high, amounting to approximately 99%. What is difficult with personal recognition, however, is the preceding step, namely first to find the face in any random picture and make a perfect "cutout" thereof. What may appear to be a minor difference in a literal comparison of face recognition and face finding ultimately is decisive for the quality of the result of facial and, therefore, personal recognition.

Image comparison by resorting to the Hausdorff spacing is based on the following principles:

Two groups of dots are formed of the binarized image and the face model $A=\{a_1, \ldots, a_m\}$ and $B=\{b_1, \ldots, b_n\}$ The Hausdorff spacing then is defined by $H(A,B)=\max(h(A,B),h(B,A))$ with $$h(A, B) = \max_{a \in A} \min_{b \in B} \|a - b\|.$$

The system and method according to the invention are not susceptible to the most frequent disturbing effects, such as rotation, different scaling, or distortion of the picture because it is easy to take these into account when comparing the dot groups. Nor is a long learning process needed for application of the method according to the invention, in contrast to the use of neuron networks. Other than with the approaches by way of neuron networks, furthermore, it is not necessary to predetermine, learn, or otherwise allow for any "non-face images". The system recognizes a face like a person does, based on the characteristics of the face itself rather than by relying on background traits which thus need not be taken into consideration. Special characteristics looked for (e.g. a person wearing glasses) quickly can be taken into account in the model by designing the model or "line drawing" accordingly.

In the future, the system and method according to the invention may be used in biometric identification systems for automatic biometric access control with which often facial recognition is combined with speech recognition, lip movement recognition, retina scanning etc. The invention permits to find the exact face sector, locate the exact eye position for retina scanning, locate the exact mouth position for calculating lip movements, and the like.

But the system and method according to the invention can be applied much more universally too, for instance, by establishing certain binary models so that only persons with certain facial characteristics will be recognized in order to make a distinction according to such aspects as mimics, race, or gender. The method and system according to the invention are not even restricted to face binding because the model for which the search is made also might comprise a hand or another one or more parts of the human body or some matter.

In its preferred embodiments the invention provides for use of a modified Hausdorff spacing to perform the face finding so that the calculating expenditure may be minimized and, therefore, a result be obtained within reasonable computing time. The present embodiment of the modified Hausdorff spacing for face finding permits detection of approximately one face image per second.

In addition, the invention provides a novel preselection of the image by special utilization of the voronoi surface, as further contribution to accelerating the process.

The system and method according to the invention can be realized by software as well as hardware modules, the modified algorithms either being programmed or implemented as separate hardware so that they are real-time suitable, at least in the hardware embodiment.

The invention will be described in greater detail below with reference to the drawings, in which:

FIG. 1 shows the original picture of a person, including the face, shoulder part, and background.

Figure 1:
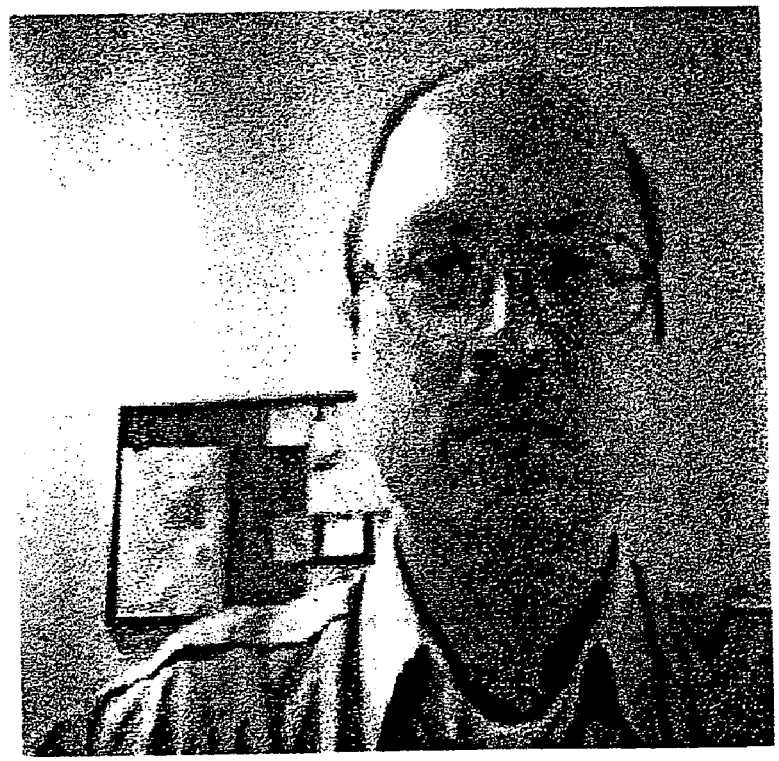
FIG. 1 shows an original picture taken with a digital camera.
Figure 2:
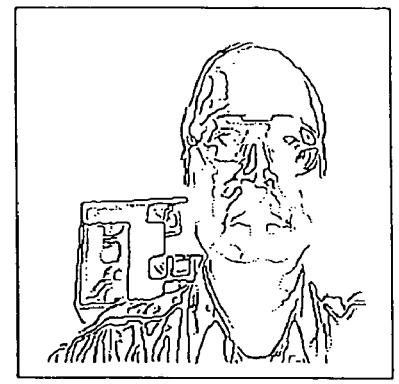
FIG. 2 shows a binarized version of the original picture of FIG. 1.

By edge extraction, this picture is converted into the binarized image illustrated in FIG. 2. To accomplish that, the edges at the transitions between bright and dark in the original picture are used to prepare a kind of line drawing of the binarized image as illustrated in FIG. 2. What is looked for is the two-dimensional face model of FIG. 3, with the aid of the Hausdorff spacing, under the conditions explained in greater detail below.

The general Hausdorff spacing offers a means of determining the similarity of one dot group with another one by examining the proportion of dots in the one group which are located close to dots in the other group, or vice versa. There are two parameters to decide whether the two dot groups are similar or not: (i) the maximum distance by which the dots may be spaced from one another and yet be observed as lying close to one another, and (ii) which is the maximum proportion of dots in one group that has this distance from the dots in the other group.

Face finding by the measure of the Hausdorff spacing differs from other techniques, such as binary correlation, because there is no pairing of dots in the two groups which are compared. An explanation of the mathematical principles of the Hausdorff spacing may be found in the internet under the following address: http://www.cs.cornell.edu/Vision/hausdorff/hausmatch.html. The principles of the Hausdorff spacing to which reference is made are explained in that document.

Figure 3:
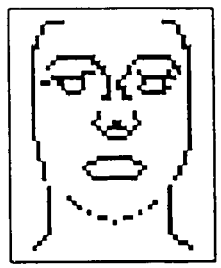
FIG. 3 shows a binary face model in the form a line drawing.

The two-dimensional image of the picture presented in FIG. 3 thus serves as a face model to be localized in the binarized image of FIG. 2, making use of suitable two-dimensional transforms and scalings.

Figure 4:
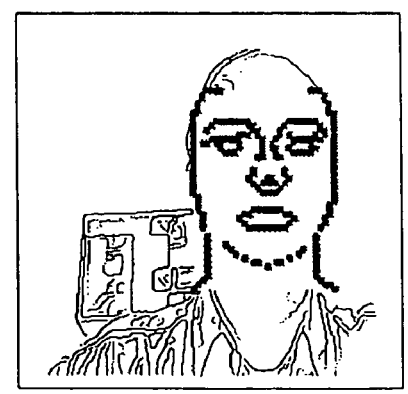
FIG. 4 shows the position of the face model found in the binarized image of FIG. 2 with the assistance of the face model of FIG. 3.

FIG. 4 shows the best conformity of the model of FIG. 3 with the binarized image of FIG. 2 and, therefore, the position found of the model in the binary image in the sense that in FIG. 4 the greatest proportion of binarized edge points of FIG. 2 lie in the vicinity of the image dots of FIG. 3. When applying the Hausdorff spacing, conformity between the face model and the binarized image is found even if the corresponding binary dots do not coincide precisely.

To practice this model-based face finding method, the following modifications of the Hausdorff spacing are made in a preferred embodiment of the invention in order to achieve face finding in real time:

The invention uses a hierarchic approach with which, to begin with, the binarized image is greatly reduced in size, a correspondingly small face model is searched for in the reduced binarized image; when a specific region is recognized as a likely location of the face looked for then this region and its surroundings are enlarged in order to continue with the search operation based on a model face of corresponding greater size, and so on.

Different models are used in this hierarchic type of search, i.e. with the greatly reduced binarized image, for example, a model (FIG. 3) including shoulders is used so that the recognition of the person will be reliable. The greater the scale of the binarized image, the finer the resolution and the more detailed the model will be for the face finding so that, ultimately, a model can be used which includes nothing but eyes, nose, and/or mouth, for example.

The edge extraction for preparing the binarized image of FIG. 2 likewise may be adapted to the respective hierarchic levels at which resolutions of different degrees of fineness are required. The invention provides for use of an adaptive Sobel filter to accomplish that.

Respective suitable rotations of the image and/or model may be made within the various hierarchic levels.

Additionally, the invention preferably provides for pre-filtering of the binarized image (erosion, dilation, etc.).

The modification of the Hausdorff spacing is another important feature of the invention. An especially preferred embodiment of the invention provides for working with a modified Hausdorff spacing in which not only the average distance of all the minimum distances between the model and the image is utilized as the measure of the spacing. Instead, the average value of the first x % (0<x<100) of all the minimum distances serves as the basis for calculating the Hausdorff measure so that larger deviations ("escapes") will not be taken into account and falsify the result.

What is claimed is:

1. A method of finding a face in a binarized image by comparing the dot group of the binarized image with the dot group of a face model, the face model being subjected to multiple two-dimensional transforms in order to locate the face model in the binarized image, and the dot groups of the binarized image and the face model being compared on the basis of the Hausdorff spacing between the dots of the dot groups and a position of a face in a binarized image is found when a measure derived from the Hausdorff spacing fails to reach a limit value.

2. The method as claimed in claim 1, wherein the binarized image is derived from the original image by means of edge extraction.

3. The method as claimed in claim 2, wherein the binarized image first is compared on a small scale with a face model of corresponding small size, the area of the binarized image in which a face was found is enlarged and compared once again with a face model of corresponding larger size, the enlarging and comparing of the binarized image area and face model are repeated, as the case may be, until the face in the binarized image was localized with sufficient accuracy.

4. The method as claimed in claim 3, wherein different face models with different resolutions are used depending on the size of the binarized image.

5. The method as claimed in claim 4, wherein the edge extraction for deriving the binarized image from the original image is carried out with different resolutions depending on the size of the binarized image.

6. The method as claimed in claim 5, wherein the face model and/or the binarized image are rotated and different steps of the rotation are used depending on the size of the binarized image.

7. The method as claimed in claim 4, wherein the face model and/or the binarized image are rotated and different steps of the rotation are used depending on the size of the binarized image.

8. The method as claimed in claim 3, wherein the edge extraction for deriving the binarized image from the original image is carried out with different resolutions depending on the size of the binarized image.

9. The method as claimed in claim 8, wherein the face model and/or the binarized image are rotated and different steps of the rotation are used depending on the size of the binarized image.

10. The method as claimed in claim 3, wherein the face model and/or the binarized image are rotated and different steps of the rotation are used depending on the size of the binarized image.

11. The method as claimed in claim 1, wherein the binarized image first is compared on a small scale with a face model of corresponding small size, the area of the binarized image in which a face was found is enlarged and compared once again with a face model of corresponding larger size, the enlarging and comparing of the binarized image area and face model are repeated, as the case may be, until the face in the binarized image was localized with sufficient accuracy.

12. The method as claimed in claim 11, wherein different face models with different resolutions are used depending on the size of the binarized image.

13. The method as claimed in claim 12, wherein the binarized image is derived from the original image by means of edge extraction and, the edge extraction for deriving the binarized image from the original image is carried out with different resolutions depending on the size of the binarized image.

14. The method as claimed in claim 13, wherein the face model and/or the binarized image are rotated and different steps of the rotation are used depending on the size of the binarized image.

15. The method as claimed in claim 12, wherein the face model and/or the binarized image are rotated and different steps of the rotation are used depending on the size of the binarized image.

16. The method as claimed in claim 11, wherein the binarized image is derived from the original image by means of edge extraction and, the edge extraction for deriving the binarized image from the original image is carried out with different resolutions depending on the size of the binarized image.

17. The method as claimed in claim 16, wherein the face model and/or the binarized image are rotated and different steps of the rotation are used depending on the size of the binarized image.

18. The method as claimed in claim 11, wherein the face model and/or the binarized image are rotated and different steps of the rotation are used depending on the size of the binarized image.

19. The method as claimed in claim 1, wherein in the Hausdorff measure is determined on the basis of the average value of a certain percentage of the smallest minimum Hausdorff spacings, the percentage being between 0% and 100%.

20. A system for implementing the method as claimed in claim 19, comprising a computing device for calculating the Hausdorff spacing and the Hausdorff measure on the basis of the dots of the binarized image and the face model.

21. A system for implementing the method as claimed in claim 1, comprising a computing device for calculating the Hausdorff spacing and the Hausdorff measure on the basis of the dots of the binarized image and the face model.

* * * * *